Dec. 29, 1936.  O. THIEME  2,066,128
COMBINED TYPEWRITING AND COMPUTING MACHINE
Original Filed Aug. 29, 1929   8 Sheets-Sheet 2
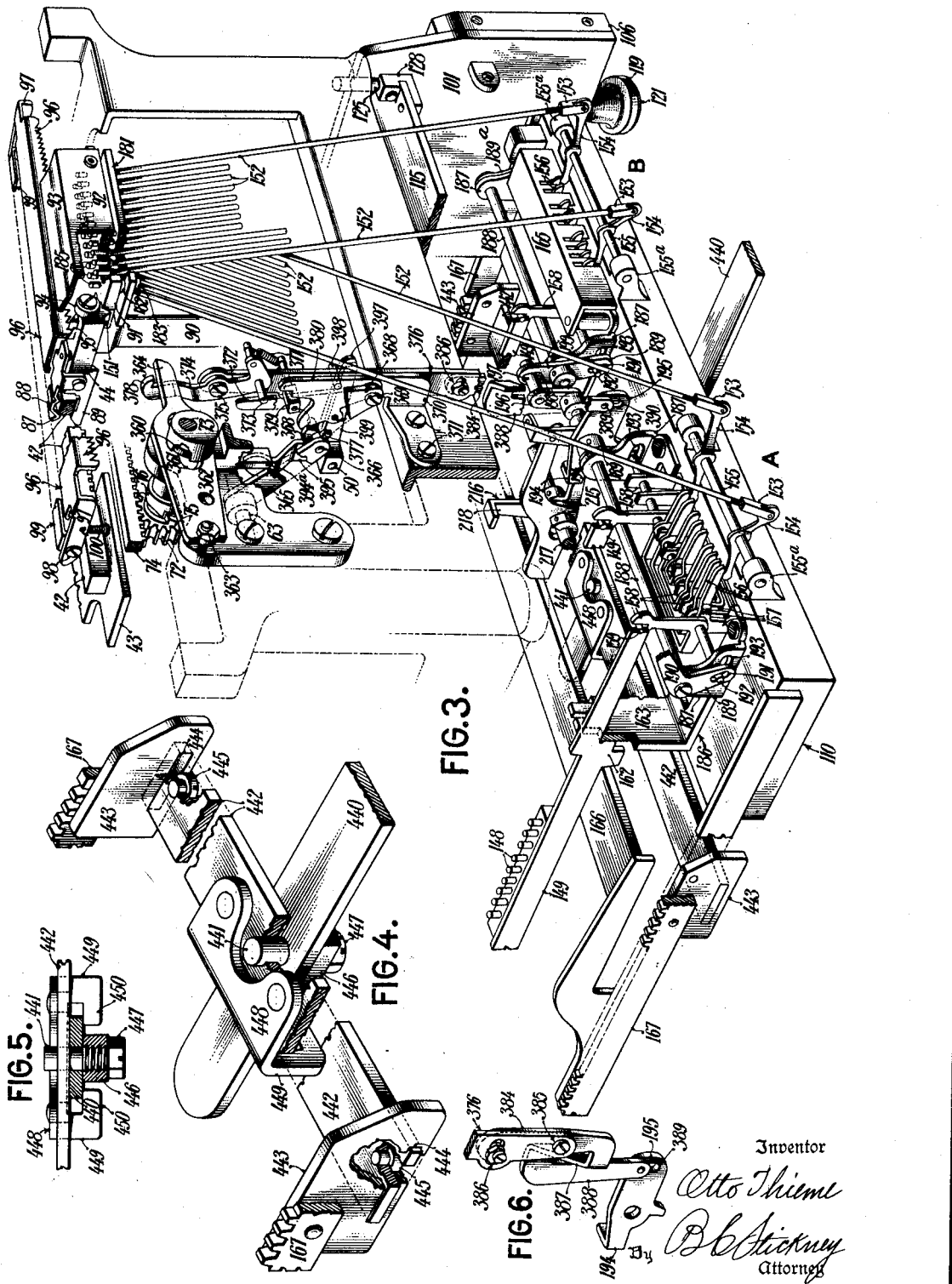
Inventor
Otto Thieme
By B.C.Stickney
Attorney Dec. 29, 1936.   O. THIEME   2,066,128
COMBINED TYPEWRITING AND COMPUTING MACHINE
Original Filed Aug. 29, 1929   8 Sheets-Sheet 3

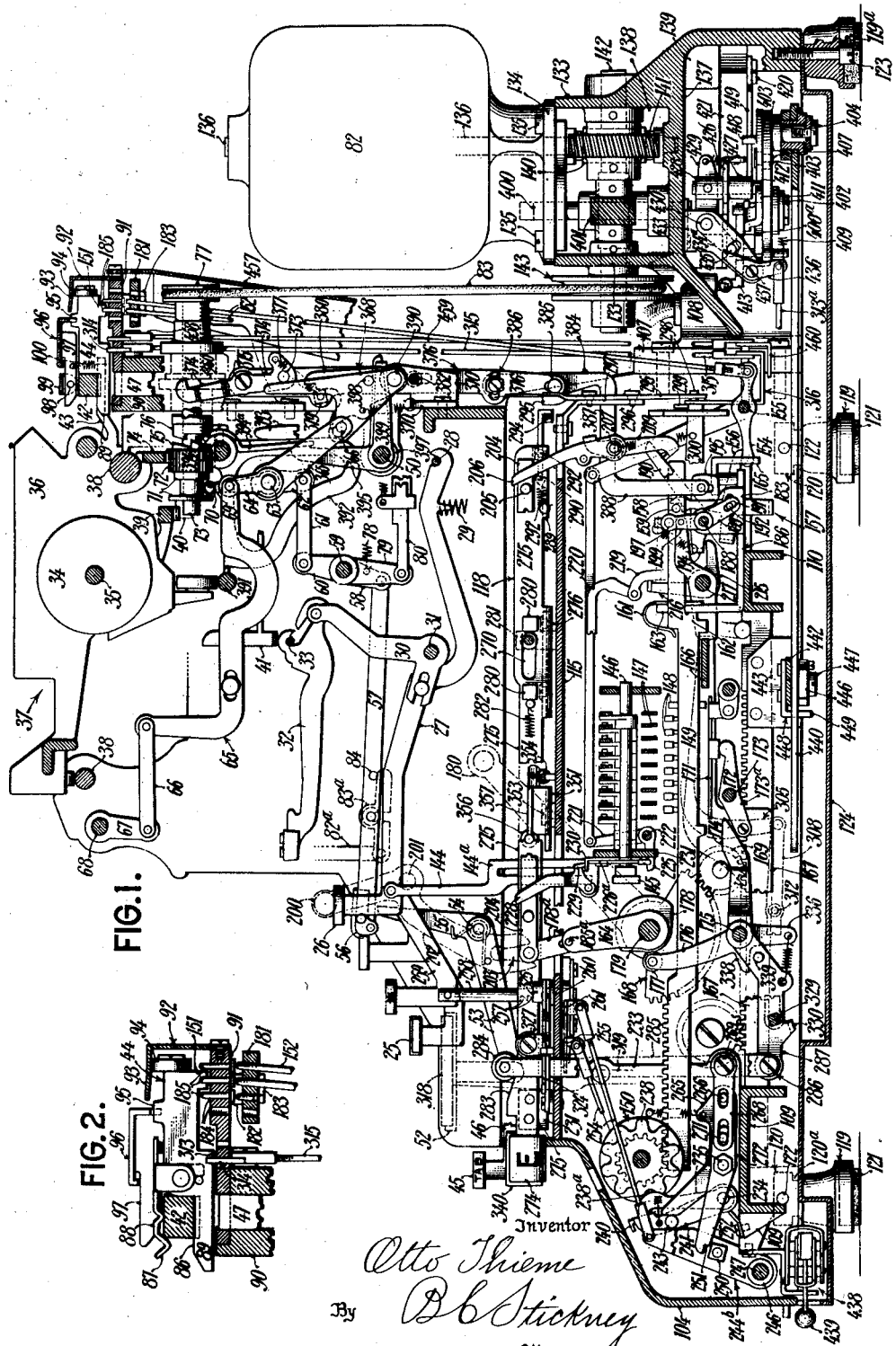

Inventor
Otto Thieme
By B C Stickney
Attorney

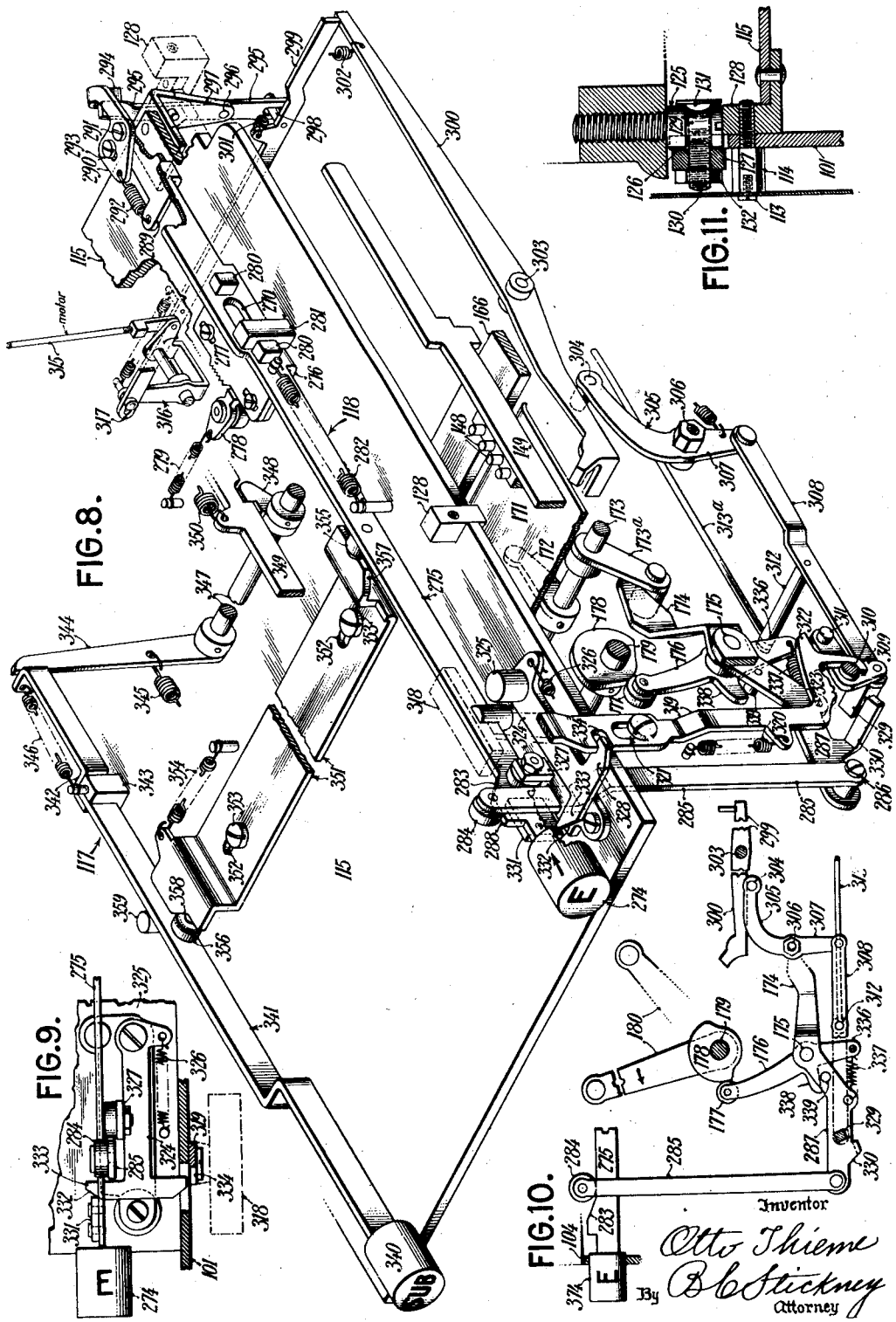

Dec. 29, 1936.  O. THIEME  2,066,128
COMBINED TYPEWRITING AND COMPUTING MACHINE
Original Filed Aug. 29, 1929  8 Sheets-Sheet 5
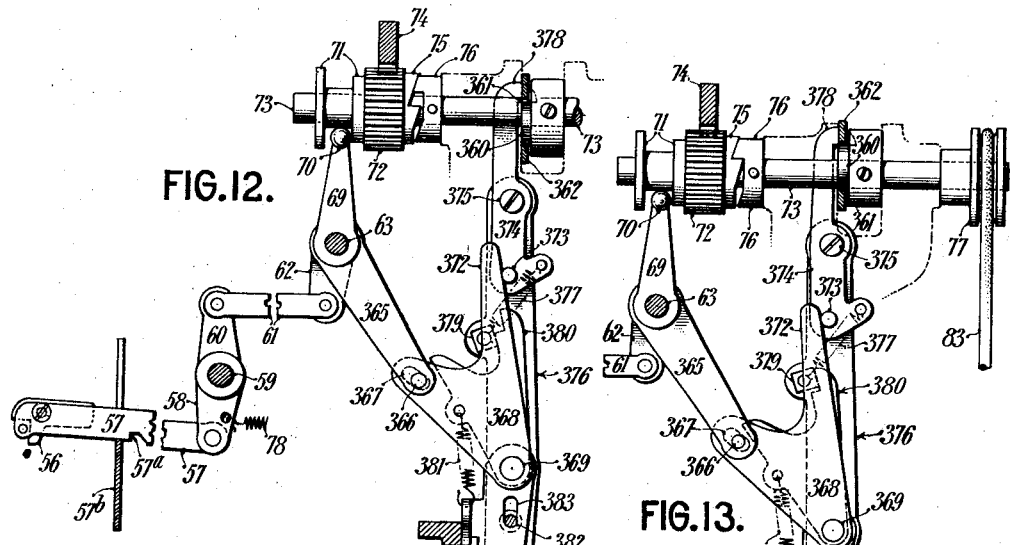
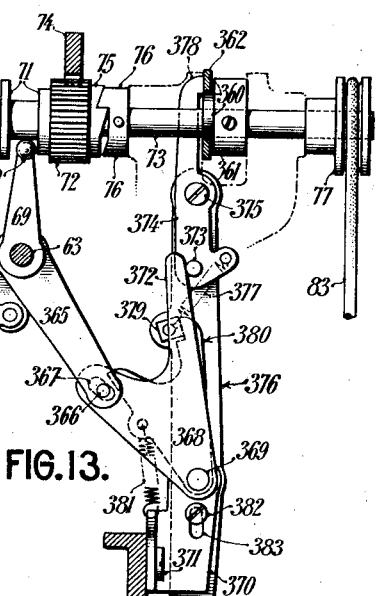
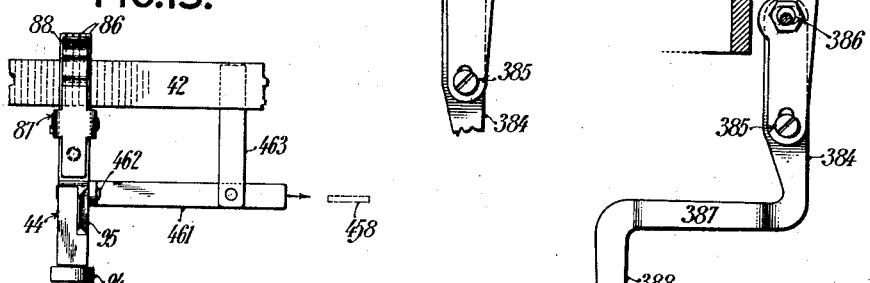
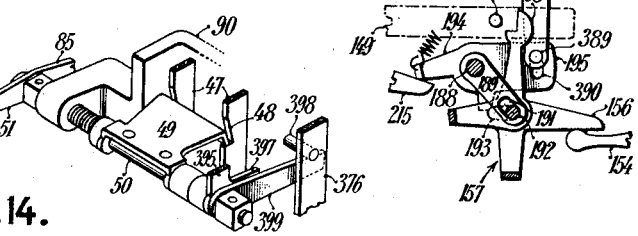
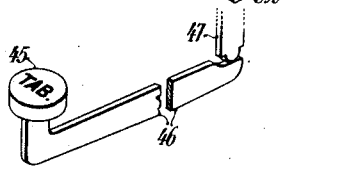
Inventor
Otto Thieme
By B. C. Stickney
Attorney

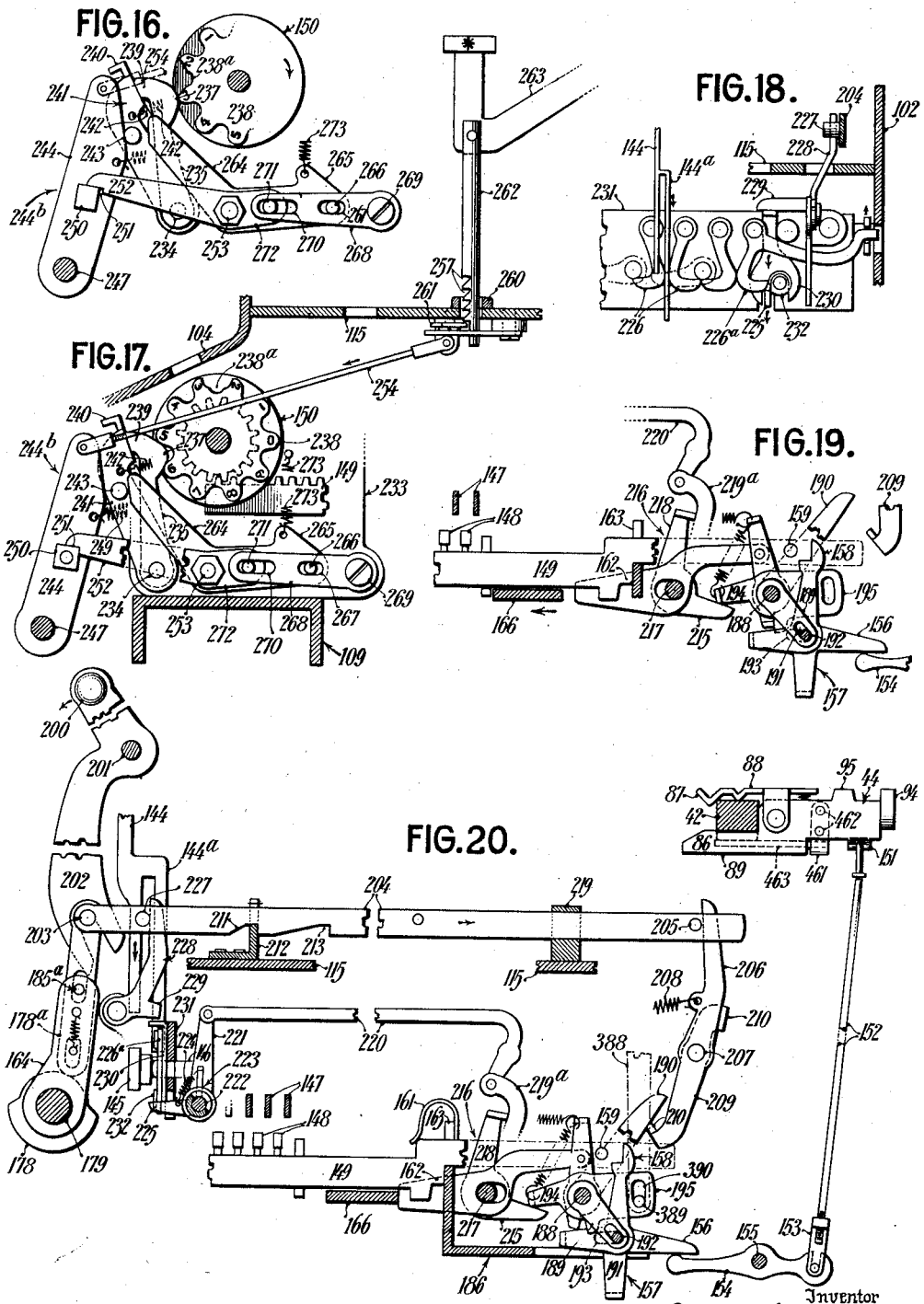

Dec. 29, 1936. O. THIEME 2,066,128
COMBINED TYPEWRITING AND COMPUTING MACHINE
Original Filed Aug. 29, 1929 8 Sheets-Sheet 7

Inventor
Otto Thieme
By B C Stickney
Attorney

Dec. 29, 1936.  O. THIEME  2,066,128
COMBINED TYPEWRITING AND COMPUTING MACHINE
Original Filed Aug. 29, 1929   8 Sheets-Sheet 8
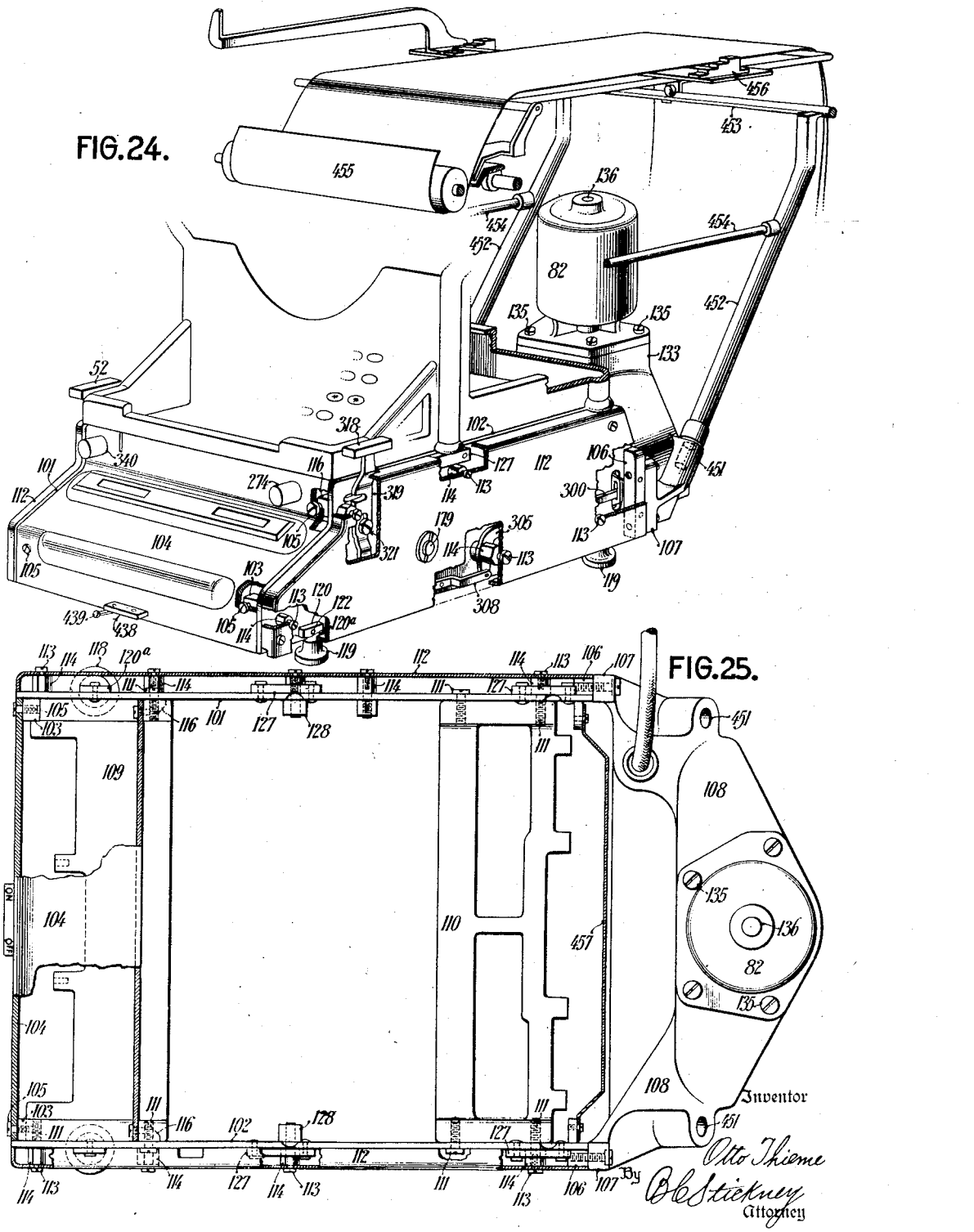

Patented Dec. 29, 1936

2,066,128

UNITED STATES PATENT OFFICE 2,066,128

COMBINED TYPEWRITING AND COMPUTING MACHINE

Otto Thieme, Hartford, Conn., assignor, by mesne assignments, to Underwood Elliott Fisher Company, New York, N. Y., a corporation of Delaware Original application August 29, 1929, Serial No. 389,152. Divided and this application October 8, 1931, Serial No. 567,605

7 Claims. (Cl. 235—60)

This invention relates to combined typewriting and computing machines of the Underwood-Hanson class, and discloses a power-operated portable or desk-machine, as distinguished from the machine heretofore mounted upon a truck to be wheeled from place to place for manipulation.

Some of the novel features include a motor-unit that can be applied to a hand-operated computing machine already in use, to convert the machine into a power-driven mechanism; a motor-unit compactly mounted upon the rear of the machine-frame, with reduction gearing and a clutch having a direct driving connection with the general operator, and effective without increasing the height of the machine and without spreading the parallel trains of registering mechanisms of the standard two-register machine, for driving the connections to the general operator; a computing base-frame having punched-out mechanism-supporting and mechanism-enclosing sheet-metal side plates to supersede the usual lacquered cast plates that require special protection to prevent injury during the assembly of the computing mechanisms and during the storage of the fully-assembled computing base as a stock-unit; the unfinished sides of the computing base, after it is completely assembled in the typewriting-machine frame, being enclosed by die-formed highly polished thin sheet-metal plates, as a final assembly operation for the combined machine; a simplified means for rendering the transposition levers ineffective to advance the pin-bars seriatim to pin-setting positions, and thereby silencing the pin-setting function of the numeral-keys in typing; a transposition mechanism pre-assembled and pre-adjusted to form a finished stock-unit contained within an attachable frame, that includes an aligning and supporting comb for the pin-bars, and also shiftable fulcrum-rod connections for the series of transposition levers, the fulcrum-rod of said series of levers being shiftable to a position where the denomination-selecting push-rods will be ineffective to shift the pin-bars to pin-setting position; an improved column-stop provided with means reinforcing the subtraction-setting member of the stop, to check the rocking of the stop upon the stop-bar, while operating the train of depressible subtraction-setting mechanism; an improved mechanism effective to lock the numeral-keys in certain zones, and during the automatic return of the carriage and the tabulation of the carriage; connections with the non-compute key automatically effective to silence the transposition mechanism and simultaneously release the locked numeral-keys for typing only; improved means for locking the subtraction-key while the error-key is effective; improved means for locking the error-key while the subtraction-key is depressed; and improved means for locking the numeral-keys when the error-key is depressed, and simultaneously lock the subtraction-key.

Other features include an improved method of transmitting a straight-line thrust from tappet-operated vertical plunger-pins to two laterally separated transposition mechanisms, by the employment of novel light, long, two-part denomination-rods, each effective to transmit the required lateral or angular thrust without cranking or buckling effect; and the provision of four separate assembled units, a typewriting mechanism, a computing mechanism, a motor-driving mechanism and a fan-fold web and carbon-feeding mechanism, all four mechanisms combined to form a compact machine-unit; and also sockets provided for the motor and carriage frames, to receive rods or struts to support the fan-fold web tracks over the motor-mechanism.

This is a division of my application, Serial No. 389,152, filed August 29, 1929.

Other features and advantages will hereinafter appear.

In the accompanying drawings,

Figure 1 is a vertical section, fore and aft of the machine, showing a typewriting machine, with motor-driven computing mechanism.

Figure 2 is a vertical section through the denominational stop-frame, showing a novel column-stop adjusted to the carriage rack-bar and having stop-means engageable by the denominational stops, and a tappet-means selectively operable to operate the thrust-bars and transposition levers.

Figure 3 is a skeleton perspective view, showing the two spaced-apart sets of transposition levers, each set connected by a group of thrust-rods, the groups converging to a central computing zone for both registers.

Figure 4 is an enlarged perspective view of portions of the general operator, showing a cross-bar having a pitman-connection to the motor.

Figure 5 is a detail construction of the pivotal pitman-connection to the cross-bar of Figure 4.

Figure 6 is a detail, in perspective, showing a connection between the carriage-returning mechanism and the numeral-key-locking means.

Figure 8 is a perspective view of some of the computing mechanism, including the subtraction-key, the error-key and motor-starting key and connections.

Figure 9 is a plan view of a two-way shuttle interlock between the error-key and the motor-starting key to avoid simultaneous depression of these keys.

Figure 10 is a diagrammatic view, showing the operating handle on its forward stroke and the means effective to prevent the depression of the error-key.

Figure 11 is a sectional view through one of the machine-supporting metal feet of the typewriting machine, the hardened lugs on the computing-machine base upon which the feet rest, and the tapered locking pins that removably secure the feet in position to lock the typewriting-machine base to the computing-machine base.

Figure 12 shows a carriage-return clutch in interlock, and the means vibrated by the pinion-shaft operative to lift a train of mechanism and lock the keys until the carriage-return movement is completed.

Figure 13 shows the parts of Figure 11 in lifted or key-locking position.

Figure 14 is a fragmentary perspective view of the carriage-releasing universal bar and connections that are rendered effective when a tabulating key is depressed.

Figure 15 is a plan view of the special column-stop adjustable upon the carriage-stop bar, showing the means for reinforcing the usual subtraction-setting extension.

Figures 16 and 17 illustrate the detenting assemblage for the register-wheels, and the condition of the star-key when the wheels are not cleared to zero.

Figure 18 is a fragmentary front view of the pin-setting frame, showing the locking interponent that fills up the working gap between the series of interlocking pendants and the novel means for controlling the interponent.

Figure 19 shows the general operator moved forwardly, which causes the silencing of the transposition levers and locks the numeral-keys until the return cycle of the general operator restores these parts to normal position.

Figure 20 shows the non-compute mechanism and the novel way of releasing the locked numeral-keys, and the connections for silencing the transposition levers to the pin-bars.

Figure 24 is a perspective view of the assembled typewriting, computing and fan-folding mechanisms forming a compact machine-unit that rests upon a table.

Figure 25 is a plan view, showing the detail structure of the computing-machine base.

Figure 7:
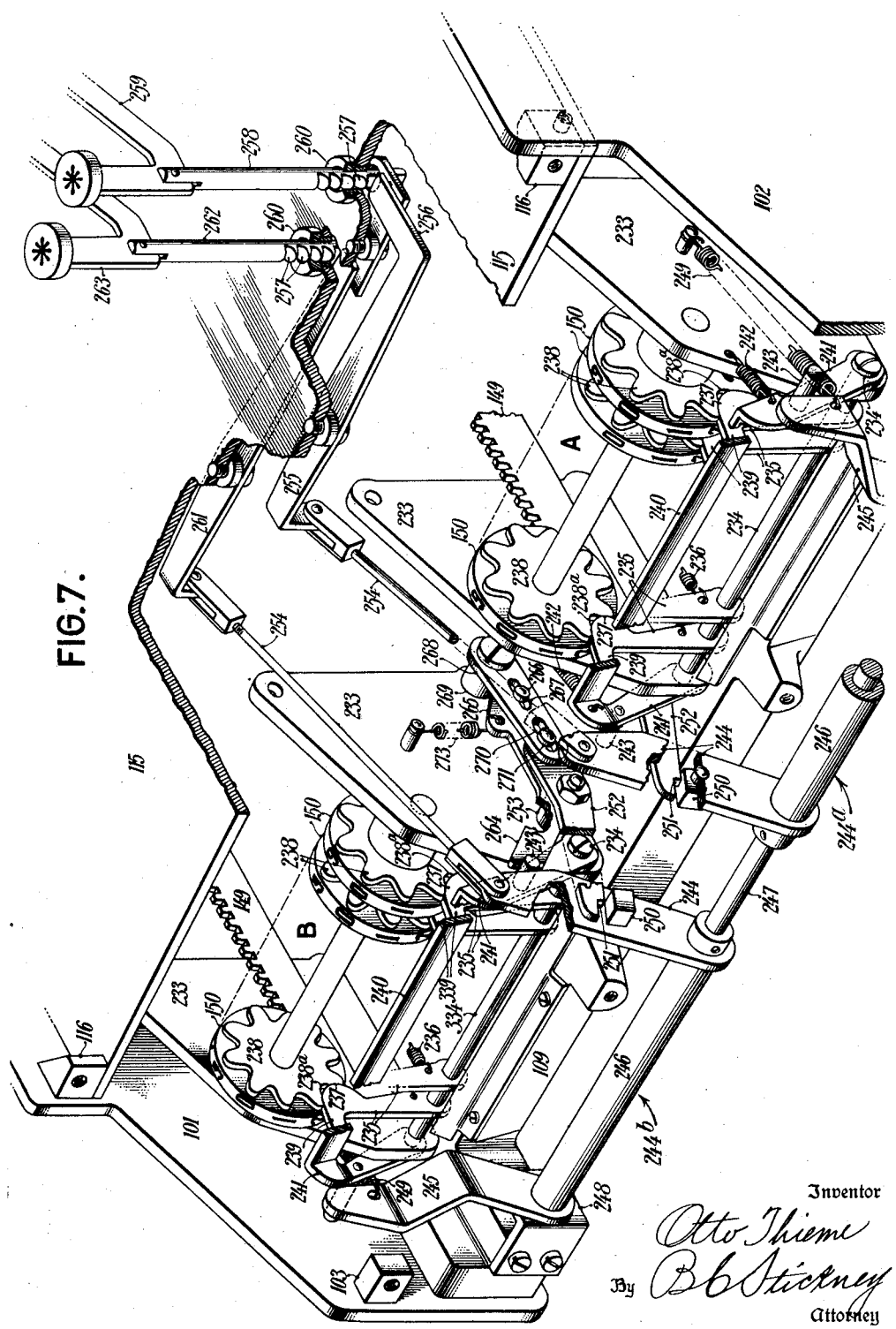
Figure 7 is an enlarged perspective view with parts of the computing means broken away to disclose the registering mechanism and the control of the register-wheel detents, to determine the state of the numeral-wheels by an interlock with the star-key.

In Figure 1 of the drawings, alphabet-keys 25 and numeral-keys 26 swing levers 27 about a fulcrum-wire 28 and against a compression spring 29, to vibrate a bell-crank 30 about a rod 31, to swing a type-bar 32 about a segment-wire 33 upwardly and rearwardly to strike a platen 34. The platen may be supported by a platen-shaft 35 having bearings in each carriage-end 36, and may be provided with the usual line-spacing and paper-feeding devices, not shown. A carriage 37 includes a rectangular frame mounted to ride upon rails 38 under the tension of a carriage-motor, not shown. To feed the carriage in letter-spacing, the usual carriage-feed-rack 39 is in train with a pinion 40 that is controlled by an escapement-mechanism, not shown, but which may be operated by a universal bar 41 vibrated by each type-bar in typing, in the well-known Underwood manner.

The carriage also has a tabulating mechanism including a rack-bar 42 supported by brackets 43 at the rear of each carriage-end 36, to receive column-stops 44 adjustably assembled therealong. The usual denominational tabulator-keys 45 at the front of the keyboard depress levers 46, to lift vertically-disposed denominational stops 47 and project the upper free ends thereof into the path of an advancing carriage-stop 44. Each stop 47 has a notch 48, Figure 14, to engage a universal bar 49 to rock a shaft 50 when any stop 47 is lifted, to operate a crank-arm 51, to release the carriage-rack from the escapement-pinion, as shown in the patent to Roberts, 1,066,224, dated July 1, 1913.

The carriage is provided with a motor-driven carriage-return mechanism, in many aspects disclosed in the patent to Henry L. Pitman, 1,580,326, dated April 13, 1926. A carriage-return key 52 is connected to an arm 53 of a bell-crank pivoted upon a stationary stud 54, formed with an upright arm 55 and provided with a spring. The arm 55 may be a trip arm operative to swing under a tripping cam 56, Figure 12, fixed to the forward end of a bar 57 formed with a notch 57ª to engage the bottom of a slot in the key-lever front comb 57ᵇ. The rear end of the bar 57 is pivotally suspended from the end of an arm 58 fixed to a shaft 59, carrying a crank-arm 60 connected by a link 61 to an arm 62 depending from a shaft 63, having a second arm 64 connected by a forwardly-extending bar 65 which communicates by a link 66 to the end of an arm 67 secured to a rock-shaft 68.

The shaft 63 has an operating arm 69 provided with an anti-friction ball-terminal 70 operative between flanges 71 of a pinion 72 slidable upon a shaft 73 and at all times in tooth engagement with a rack 74 secured to the carriage 37. The pinion 73 is formed with clutch-teeth 75 shiftable with the pinion to engage with the teeth of a clutch-head 76 fixed to the shaft 73 and rotated by a pulley 77 connected to a novel source of power to be described.

Depression of the key 52 trips the cam 56 to raise the front end of the bar 57, to lift the notch 57ª free of the comb-plate 57ᵇ to respond to the tension of a spring 78 to rock the shafts 59, 63 and 68, and shift the pinion 72 into clutching engagement with the head 76, to return the carriage when power is transmitted to the pulley 77. The rocking of the shaft 59 rocks an arm 79 to push a bar 80, communicating with the make-and-break switch-arm 81, shown at Figure 21, that closes a plugged-in circuit to a motor 82, which drives a belt 83 connected to the pulley 77 to drive the returning pinion 72.

A trip on the carriage, similar to that disclosed in the patent to Frederick A. Hart, 1,238,908, dated September 4, 1917, operates to rock the shaft 68 in a clockwise direction to effect the release of the pinion 72 from the rotating clutch-head 76, withdraw the bar 80 and the switch-arm 81 to open the motor-circuit and at the same time shift the bar 57 forwardly to re-engage the bar-holding notch 57a with the comb 57b.

Instead of a manual carriage-return control as by the key 52, said patent to Hart also discloses a marginal stop-control at the line-end position of the carriage which effects the depression of a vertical link 82a, to swing a lever 83a to engage a stud 84 on the bar 57 and lift the notch 57a out of the comb-slot and free the bar and connections to the spring 78 to effect the return of the carriage independently of the key 52.

Figure 14 shows means for preventing the depression of the carriage-return key 52 while any tabulator-key is depressed. The shaft 50 has an arm 85 to interfere with the rearward sliding movement of the bar 80 and prevent closing of the switch-arm 81 to start the motor. The depression of any tabulator-key 45 is also prevented during the depression of the carriage-return key, the bar 80 passing over the end of the arm 85 to prevent the lifting of said arm and arrest the movement of the universal bar 49 by any stop 47, all as more fully described in the patent to Adolph G. Kupetz, 1,807,626, dated June 2, 1931.

The column-stop shown in Figure 2 is an improvement on the stop shown in my Patent No. 1,649,329, dated November 15, 1927, where the stop has teeth 86 that enter slots cut in the under face of the bar 42, and is supported by a spring-pressed clip 87 that is formed with stop-holding and stop-positioning detents 88. The stop is further formed with a depending lip 89 to be engaged by the tabulator-stops 47. The tabulator stop-frame 90 includes a horizontal plate-extension 91, the end of which supports an L-shaped bracket 92 that includes a horizontal housing section 93 paralleling the extension 91. The rear end of the stop 44 carries an anti-friction roller 94 which rolls against the under face of the section 93 to prevent the stop from being cammed upward in passing over upright selecting devices, to be described. To further reinforce the stop and maintain its alignment, the stop may be provided with a rachet-shaped tooth 95, Figures 2 and 3, to interlock with the ratchet-teeth of a universal bar 96. The latter has bent-over end-arms 97 having screws or pivot supports 98 for the ends of the rack 42. A scale-plate 99 is held above the bar 42, by which the stops 44 may be set from a reading at the platen-scale. A spring 100 presses the bar 96 into engagement with the tooth 95 of each stop 44 adjusted upon the rack 42.

Heretofore, the Underwood-Hanson computing-machine base-frame, upon which the typewriter is assembled for co-operation, included cast iron plates, pre-machined and highly lacquered before the assembly of the parts, and these surfaces had to be carefully protected from mars and scratches during the subsequent handling and the assembling of the many complicated parts. The assembly of all the parts within the enclosing cast iron plates presents difficult problems, especially for readjustments, and such shafts, screws, etc., that penetrate the polished side plates, required much costly nickel work.

The present structure includes the substitution of thin cold-rolled, punched-out, steel plates 101 and 102. These plates in their original state are smooth, polished and of uniform thickness, and all clearance-slots and holes to be threaded may be pierced by the punching operation.

Referring to Figure 25 in particular, the two plates 101 and 102 are each provided at the front end with a stiffening bar 103 permanently secured to the inner face of the plates. A front cover-plate 104 may be secured by screws 105 threaded into said bars.

The rear ends of the plates 101 and 102 are also supplied with bars 106, to which feet 107 of a motor-supporting frame or casing 108 may be secured, to the tie the two rear ends of the plates together and complete the computing base.

To further stabilize this sheet-metal frame, there are provided a register-supporting cross-bar 109 and a transposition linkage-supporting bar 110, both bars secured between the two plates 101 and 102 by means of screws 111 threaded from the outside of the plates.

Thin japanned side plates 112 may rest upon the faces of the bars 106 with the forward end bent over for a round corner, to maintain parallelism of the side plates with the plates 101 and 102, and the side plates being secured by screws 113 that thread into the ends of suitable plate-spacing studs 114 secured to the side plates 101 and 102. In this manner, there is provided a working space at each side of the base-frame between the plates 101 and 102 and the side plates 112, where unfinished screw-heads, springs and flat steel linkages and other connecting mechanism may be exposed and be readily accessible for adjustments upon the removal of the cover-plates 112. These cover-plates mask the main framework and give an attractive finish to the machine.

The computing base may also include a sunken top plate or floor 115 secured to suitable blocks 116 on said plates 101 and 102 to support the confined subtraction-key mechanism 117 and elimination-key mechanism 118.

The side plates 101 and 102 are further provided with permanent felt-protected feet 119 formed by a screw-machine operation into a bell-shaped unit with a boss-section 120 at one end, and the other end counterbored for a rubber pad 121 and drilled and tapped for a pad-retaining screw. The boss-section 120 is straddle-milled to form an integral central tongue 120a and also to form a seat for the edge of the plates, and the tongue may be positioned against the side plates 101 and 102 and riveted thereto at 122. Four feet 119 may be assembled to the side plates in the manner described, and a special foot 119a that supports the motor-frame 108 may be attached by a foot-holding screw 123 threaded into the frame 108. The base-frame may also contain a removable dust pan 124 enclosing the under side of the frame.

Metal feet 125, Figure 11, are screwed into the type-writer base-frame, and enter machine-locating half-round vertical grooves 126 in the upper inner sides of the two side plates 101 and 102, and at each groove the side plate may be reinforced by plates 127 riveted to the outside face of the side plates. Each foot 125 is hardened and after entering the locating grooves 126 loosely rests upon a hardened block 128 secured to the upper face of the top plate 115, see Figure 3.

The typewriting-machine base does not rest upon the top edges of the two side plates 101 and 102, but the hardened feet 125 rest upon the hardened blocks 128 to support the weight of the machine. The typewriting machine is secured to the computing base, after setting the feet 125 upon the blocks 128 and within the grooves 126 in the side plates. For this purpose, each foot may include an annular groove 129, see Figure 11, and a clamping screw 130 may be threaded through the side plate and formed with a conical head 131 which may be drawn into the annular groove of a foot, to lock it and prevent upward displacement of the feet from the blocks 128. The screw 130 may have a lock-nut 132.

From the description of this built-up computing-base section it will be understood that the frame may pass through the mauling stages of bench-assembly and require no cumbersome wrappings to protect finished surfaces, and that at the final assembly of all the computing mechanisms therewithin, the base becomes a unit that can be stored on shelves as a stock-product requiring no particular protection from injury by surface-contact.

It will also be noted that the computing base may be fully assembled before the motor and its casing are attached, thus relieving the assemblers of the labor of shifting this added motor-weight during the many assembly-operations, and that the surface-finished motor-casing may be the final addition to the unit.

The motor-supporting casing 108 converges rearwardly from the position of the side feet 107, secured to each end of the side plates 101 and 102, to a point midway between the two plates; giving a central position to the motor 82; and its driving transmission extends forwardly through the longitudinal center of the base and between the two registering mechanisms of the computing mechanism.

The side wall of the motor-casing merges with a short hollow pedestal 133 to support a flange 134 of the vertically-disposed motor 82 that may be secured by screws 135. The free end of motor-shaft 136 takes an end bearing in a horizontal wall 137 at a point between a pedestal-space 138 and a space 139 in the casing 108. The motor-shaft carries a worm 140, effective to drive a worm-gear 141 secured to a horizontal shaft 142, having bearings in the side walls of the pedestal 133; and the exposed forward end of said shaft 142 is provided with a driving pulley 143 which communicates power by the belt 83 to the pulley 77.

Each numeral-key 26 has a pendant 144 which when depressed engages a crank-arm 145 to rock a shaft 146, that moves a pin-setting bar 147 to depress one of a series of index-pins 148 in a pin-bar 149; there being one bar for each register-wheel 150.

The column-stop 44 is formed with a tappet 151 to engage the upper ends of thrust-rods 152 as the carriage letter-spaces the tappet step by step through a computing zone. Each thrust-rod 152 has its lower end threaded into a clevis 153 pivotally secured to the outer end of a lever 154, and the series of levers may be fulcrumed upon a rod 155 having end-bearings in brackets 155ᵃ in the cross-bar 110. The inner ends of the levers 154 engage arms 156 of transposing levers 157, nested together upon a fulcrum-rod 192 to reverse the denominational order from the rods 152 to the pin-bars 149, through an arm 158 engaging a stud-pin 159 in each bar. The pin-bars 149 are shifted longitudinally seriatim under the pin-setting bars 147 as the tappet 151 depresses rods 152. Spring 161 restores the bar when released, and brings a file-spotted face 162 into contact with the face of a bar-supporting comb-plate 163, forming a part of a frame secured to the cross-bar 110, said frame in turn supporting a second comb 165, that spaces the levers 154 and the arms 156 of the transposing levers.

The index-pins are projected into the path of a cross-bar 166 of a general operator, that includes a rack 167, which may be driven by a sector 168 through an intermediate pinion 169; the bar 166 picking up the depressed pins and shifting their bars 149 forwardly to rotate register-wheels 150.

Each wheel 150 may be held by the round nose of a detent-lever 235 engaging depressions or notches formed at the side of each register-wheel. The return-stroke of the bar 149 idly rotates a pinion through the usual pawl-and-ratchet individual to each number-wheel, not shown. The return-stroke of the general operator effects the restoration of the parts, and the usual pin-restoring platform 171 is lifted by an arm 172 secured to a shaft 173, provided with a second arm 173ᵃ carrying a stud to be engaged by one arm 174 of a bell-crank mounted upon a shaft 175 and having a second arm 176 that carries a roller 177 to be engaged by a cam 178 fixed upon a shaft 179 that is rockable by the usual operating lever 180 to raise the platform 171 to restore the set-up pins 148.

In Pitman Patent No. 1,827,298, dated October 13, 1931, the sets of denominational thrust-rods diverge downwardly from the carriage, so that the vertical thrusts received at the tops of the rods may effect vertical thrusts at the widely-separated sets of transposition levers. This construction of the rods tends to create a cranking action that incurs liability of buckling of the light thrust-rods.

The present invention includes two parallel trains of registering elements A and B, selectively operated by individual series of transposition levers 154, assembled upon a standard two-register base, there being sufficient working space between the trains to accommodate elements of the general operator; and each series of levers is connected with a series of inclined thrust-rods. The thrust of each rod is diagonal, as determined by a straight line intersecting the point of translation at the top of the rod and the point of transmission at the bottom of the rod. The levers 154 in each set may diverge rearwardly, and each lever may be twisted to align with its rod, and each clevis 153 may have a straight threaded connection to its rod. The upper ends of the rods 152 instead of contacting directly with the tappet 151 are provided with motion-translating intermediaries in the form of vertical pins that are engageable by the tappet 151.

The plate 91, Figure 2, supports an under parallel plate 181 separated by washers 182 and secured by screws 183. The plate 91 is drilled with two or more series of vertical guide-holes 184 for pins 185. The pins are at letter-space intervals.

The loose fitting round-nosed pins or plungers 185 are assembled in the holes 184 from the under side of the plate 91, and project upwardly, a suitable head on each pin engaging the under face of said plate. The thrust-rod-holes in the plate 181 are drilled obliquely, each in the general direction of its thrust-rod.

In this manner little carriage-driving power is consumed in causing the tappet 151 to ride over and across a pin 185, and the transmission of motion from a vertically-movable pin-head to its obliquely-thrustable rods 152 is accomplished without waste. The individual adjustability of each clevis to its rod makes it feasible to present the upper end of the rod against the head of the pins and normally hold said head against the plate 91, and may, if desired, place the rods under a slight tension and take up any slack in the connections.

The present invention employs a simple silencing means, for bodily shifting back out of use the fulcrum-rod upon which the transposition levers are mounted. The rods 152 are thereby rendered ineffective to actuate the studs 159 of the pin-bars 149.

To this end, at Figure 3, each nest of transposition levers is assembled as a stock unit within a frame 186 secured by screws to the cross-bar 109 of the base-frame. The frame 186 includes the vertical comb-plate 163 that supports the rear ends of the pin-bars, and two vertical side arms 187 that provide bearings for a rockable shaft 188. To one end of the shaft 188 a bell-crank may be secured, having two arms 189 and 190, the arm 189 formed with a slot 191 to engage the shouldered down end of a fulcrum-rod 192 that rides in a slot 193 in each arm 187.

The opposite end of the shaft 188 may have secured thereto a slotted arm 189a and forming a part of a three-arm bell-crank having other arms 194 and 195. The arm 189a engages the adjacent end of the fulcrum-rod 192 supported by the slots 193 in each arm 187, and thereby suspends the series of transposition levers 154. When the shaft 188 is rocked by mechanism to be described, the fulcrum-rod 192 will move rearwardly along the slots 193, and the upright arms 158 of the transposition levers will draw away from the studs 159 of the pin-bars, and the subsequent rocking of these arms by the carriage will fail to operate the studs 159, and the numeral-key will become ineffective for pin-setting. This description will apply to either transposition group A or B.

There are separate assembly units for the transposition mechanism, and the individual rock-shafts 188 are coupled for a unitary movement, from connections that lead to only one of said units. This coupling includes a crank 196 fixed to the inner end of the shaft 188 of the group A and provided with a stud 197 to pass through a slot 198 in an arm 199 secured to the inner end of the shaft 188 of the group B. When the arm 190 is rocked to silence the transposition devices of group A, this motion will be transmitted to the other shaft 188 to silence the group B.

One means for jointly silencing the transposition devices includes a non-compute key 200, shown at Figure 20, where the key has been drawn forwardly to rock about a fulcrum-rod 201 to rock the lower arm 202 thereof rearwardly. Through a pin-and-slot connection 203 bar 204 is pushed rearwardly, and a side stud 205 vibrates an arm 206 fulcrumed upon a stud 207 to flex a restoring spring 208. The bar 204 has a sliding movement through a supporting stud 219 on the top plate 115, with the forward end at 203 pivotally supported by a link 178a having a spring-pressed pin-and-slot connection 185a with an arm 164 loosely mounted upon the shaft 179. The arm 205 has a one-way connection to a lever 209 through a bent-over ear 210, to vibrate the lower end of said lever and rock the arm 190, to rock the shaft 188 and silence the transposition devices.

The bar 204 has a detenting notch 211 engageable with a slotted bracket 212, to hold the bar against the tension of the spring 208, until the general operator rotates the shaft 179 and the cam 178 to cause the link 178a to lift the end of the bar 204 and release its notch 211 from interlock with the bracket 212; and a second notch 213 on the released bar will engage the bracket, this being the normal position of the bar 204.

The rocking of the shaft 188 by the non-compute key rocks an arm 194 fixed thereto, to engage an arm 215 of a bell-crank 216 fulcrumed upon a cross-rod 217, having a second arm 218 engageable with an arm 219a fulcrumed upon the rod 217 and connected to one end of a link 220. The link 220 is pivoted to the free end of an arm 221, secured to a rock-shaft 222 to rock the shaft when the non-compute key is shifted to the Figure 20 position. Upon the shaft 222 there is loosely held by a pin-and-slot connection 223 and a spring 224 an interponent 225, arranged to be moved into the working gap between a series of pendent key-locking dogs 226, to prevent the depression of any numeral-key while the non-compute key is being moved to its effective position.

But as it is not desired to lock the numeral-keys during the interval the non-compute key is held locked to silence the transposition levers, means are provided to unlock said keys so that numerals may be typed and not computed. To this end, the bar 204 has a side projecting stud 227 to engage a bell-crank arm 228 fulcrumed upon the pin-setting frame 231 to depress a second arm 229 to depress a slide 230 mounted upon the front face of the frame 231 for a free vertical movement upon a stud 232, see Figure 18. The slide 230 engages the interponent 225 to swing it downward to the position of Figure 18 while the spring 224 is flexed and the shaft 222 remains stationary. The withdrawal of the interponent 225 permits the extreme end dog 226a to abut the fixed stud 232 and create a working gap in the series of dogs 226 for the passage of any key-stem 144a to type.

Thus during the interval the non-compute key remains locked, the accidental operation of any of the several connections to the rock-shaft 222 will rock the shaft in the usual way, but said shaft will be ineffective to raise the interponent 225 to fill up the stem-clearance gap in the series of dogs 226.

The present improvement includes a star-key locking mechanism having the usual universal bar set by the detent-levers to a position where no movement of said bar will take place after its first movement, because of its latched condition, and all subsequent accumulating operations of the register-wheels will only operate the detent-levers, to preserve the alignment of the wheels.

To this end, the two side frames 233, Figure 7, of each register have a fulcrum-rod 234 upon which there are mounted detent-levers 235, each lever having an individual spring 236 to press the round nose 237 thereof into engagement with the round-nose wheel 238 forming a part of each register-wheel 150. Each detent is formed with a short arm 239 to engage a universal bar 240 formed as a detent-straddling bail with two arms 241 loosely mounted on the projecting ends of the rod 234 and spring-pressed against the arms 239 of the detents by a suitable spring 242 connected to each arm 241. Each wheel 238 has a special depression or notch 238a between two adjoining teeth where the round nose 237 of its detent-lever will have a greater drop than when entering the other depressions. This special detenting position corresponds with the zero on the wheels at the sight-opening of the register.

The rotation of any register-wheel from its zero position drives its detent-levers against the universal bar 240 to move the latter, and through studs 243, each arm 241 moves one of two frames 244ᵃ and 244ᵇ, each frame including two arms 244 and 245 joined together by a sleeve 246 mounted to rock upon a rod 247 supported at each end by brackets 248 secured to the frame.

Each outer arm 245 has a spring 249. To check the frame 244ᵃ or 244ᵇ from pressing against the studs 243, each arm 244 carries a projecting lug 250 secured at the side thereof, to engage in a notch 251 in the end of a latch 252. The latch is pivoted upon a stud 253, and arranged to drop behind its lug 250 when the frame is fully operated by any detent 235, in being forced out of the notch 238ᵃ, as shown at Figure 16, to lock frame 244ᵃ or 244ᵇ in its set position. In this way a comparatively strong spring 249 may be flexed to set the frames 244ᵃ and 244ᵇ, but only a light spring-tension 242 holds the universal bar against the detents 235, thus minimizing the work of the register-driving pin-bar.

The upper end of one arm 244 is connected by a link 254 to one end of a lever 255, fulcrumed to the under face of the top plate 115, with the opposite end 256 formed to dog within saw-toothed notches 257 of a vertically-disposed plunger 258, pendent from a star-key lever 259 associated with the register A, and depressible by the key, to pass through a guiding bushing 260.

In a similar manner the locking of the frame 244ᵇ for the register B swings the lever 261 to engage notches 257 in the plunger 262 connected to the key-lever 263 of the star-key associated with the register B. When the several parts are set by the operation of any detent 235 to the positions shown at Figure 17, the rocking of the frame 244ᵇ has shifted the lever 261, so that its dogging end will enter a locking notch 257 of a plunger 262 connected to star-key-lever 263 where it remains until the wheels 238 have been cleared.

At Figure 1 the register-wheels all register zero, the latches 252 have released the lugs 250, and both frames 244ᵃ and 244ᵇ have responded to their springs 249 and both levers 255 and 261 have been vibrated to release both star-key-levers 259 and 263, all made possible through the detents 235 entering the special deep depression 238ᵃ in each wheel 238 of both registers A and B.

From this zero or clear position, the accumulation of the first digit of any wheel 150 forces the detent 235 to ride out of the deep depression 238ᵃ to the highest point of the adjoining tooth of the wheel 238, as shown at Figure 16, where the stud 243 has moved the frame 244ᵃ to shift the lug 250 thereon in front of the notch 251 in the end of the latch 252 to be engaged thereby, when the active detent 235 rides into the adjoining shallow depression in the wheel 238, when the several parts will assume the positions of Figure 17 and the frame 244ᵃ is latched, the lever 255 locks the key 259 and the stud 243 almost strikes the end of a bell-crank arm 264 fulcrumed upon the stud 253. This bell-crank has a second arm 265, carrying a pin 266 engageable within a slot 267 in an arm 268 fulcrumed at 269 to the side frame 233, and formed with a second slot 270, to engage a pin 271 on a short arm 272 of the latch 252. This chain of links, under tension of a single spring 273 connected to the arm 265, secures the interlock between the latch 252 and the lug 250.

At Figure 17 it will be noted that the movement of the bar 240 by a detent 235 moves the stud 243 to give a clearance space between the arm 264 and the stud, so that the stud 243 will not be moved by said arm 264.

In clearing the wheels 150 from "9" to "0", the detents 235 will ride from the highest point of a tooth of the wheels 238 into the special depression 238ᵃ as the zero position of the wheels, and the spring 242 will move the bar 240 towards the register-wheels, and the stud 243 will engage the arm 264 to rock the arm 268 to move the arm 272 and lift the latch 252 clear of the lug 250 and free the associated frame as 244ᵃ to the flexed spring 249, and release the locked star-key-lever 259, provided all the rest of the wheels 150 are cleared to zero. The train of parts released by the stud 243 are motion-multiplying parts, so that a very slight movement of said stud will move the latch 252 a greater distance to effect the release of the frame 244ᵃ.

The zero or elimination key 274 includes a push bar 275 mounted for sliding motion adjacent the right-hand side of the plate 115. The bar 275 is formed with a bent-over foot 276 that adjustably supports a toothed plate 277. The teeth thereof, in sliding with the bar, engage a two-way pawl 278 pivotally mounted on the plate 115 having a pawl-centering spring 279, which enables the pawl to perform a full-stroke function relatively to the teeth of the plate 277, to insure a full movement of the error-key-bar 275 in both directions.

The bar 275 is slidable between stops 280 on the bar and a fixed stop 281 on the plate 115, and is restored by a spring 282. The function of the error-key, when depressed, is to vibrate the pin-restoring platform, and on the initial return movement thereof, to effect a cycle of the general operator. To this end, the bar 275 may be formed with a cam-edge 283 to lift a roll 284 secured to the upper end of a vertically-disposed bar 285, having a guiding slot through the plate 115; while the lower free end has a pivotal connection at 286 to the forward arm 287 of the lever 174, to rock the shaft 173 and arm 172 to raise the pin-setting platform 171 as previously described. At the end of the stroke of the key 274, the roll 284 will ride upon a flat dwell 288.

At the extreme rear end of the bar 275 there is formed a horizontal shelf 289, supporting a tripping cam 290 fulcrumed upon a screw 291 threaded into said shelf and having a spring 292. The movement of the cam 290 is limited in two directions by a screw-and-slot connection 293. As the bar 275 nears the end of its stroke, a bent-over arm 294 of the cam 290 rides around the upper end of a lever 295 and then snaps in back of said lever, so that when the depressed key 274 is released to the control of its spring 282, the arm 294 presents a cam-face that will operate the lever 295. The lever 295, which is fulcrumed at 296 to a bracket 297 secured to the plate 115, is formed with a bifurcated end that engages a stud 298 projecting from the side of a latch-bar 299 and having its free end overhanging the end of a lever 300.

The relation of the arm 294 to the lever 295 is such that the initial return movement of the bar 275 will slide the latch-bar 299 longitudinally against the tension of a spring 301 to release the lever 300 to the control of the tension of a spring 302. The lever 300 is fulcrumed at 303 to the side plate 101 of the base, and the forward end depresses a stud 304 at the end of a bell-crank 305 fulcrumed at 306 to said plate, and having a short arm 307 connected by a link 308 pivotally connected to one arm of a bell-crank 309. The latter is pivotally supported by a stud 310, while a second arm of the bell-crank 309 carries a stud 311. The link 308 carries a long stud 312, having its end connected to a pull rod 313ª connected to the motor-tripping mechanism to be described.

The motor may be automatically tripped by the carriage-movement in the usual manner by a lug 313 on the stop 44 (Figure 2) engaging a trip-lever 314 to lift a pull connection 315 to rock a bell-crank 316, Figure 8, to withdraw the latch-bar 299, the bar 299 having a pin-and-slot connection 317 to provide for an indepedent actuation of the bar by the carriage or by the error-key, as already described.

These several connections just described may be controlled by the usual motor-starting key 318, which includes a vertical key-stem 319 lifted by a spring 320 to a stop position determined by a screw and a slot 321. The lower end of the stem 319 has a horizontal arm 322 to overlie the stud 311, and is provided with a slot 323 to ride on the stud 310 and guide the lower end of the key-stem. Depression of the key 318 against the stud 311 rocks the bell-crank 309 and pulls the link 308 and the motor-trip connection 313ª independently of the locked lever 300.

An interlock between the error-key 274 and the motor-starting key 318 prevents the joint operation of both keys as follows. A T-shaped shuttle 324 fulcrumed upon a stud 325, threaded into the plate 115, has a spring 326 effective to throw the shuttle against a stop-lug 327, see Figure 9, giving the normal position shown at Figure 8. In Figure 9 the motor-key 318 may be depressed without interference with a leg 328 of the shuttle 324; and the rocking of the bell-crank 309 shifts a square projection 329 to overlie an arm 330, forming a part of the arm 287, to intercept any upward movement of the arm 287 and prevent the depression of the error-key 274, through the inability of the cam 283 to lift the blocked roll 284.

The depression of the error-key 274 brings a projecting plate 331, Figure 9, into contact with a cam-edge 332 of a leg 333 of the shuttle 324, to vibrate the shuttle and move the leg 328 into an open slot 334 in the adjoining edge of the key-stem 319, to prevent the depression of the motor-starting key 318 until the error-key is fully restored, and the spring 326 restores the shuttle 324 as a whole to its normal position.

Figure 10 shows an interlock where the operating lever 180 has cycled the machine, instead of the motor-key 318. The rocking of the shaft 179 rotates the cam 178, to engage the roller 177, to vibrate the arm 176 about the shaft 175, the arm 176 including a spring-arm 336, a restoring spring 337 and an arm 338 to engage a stud 339 on the arm 287. Until the lever 180 is restored to its dotted position, the lifting of the bar 285 by the error-key is prevented by the stud 339 engaging the cam-locked arm 338 of the arm 176.

The subtraction-key 340 includes a sheet-metal push bar 341, offset to form a stop-face 342 to strike a post 343 fast to the plate 115, the post 343 being slotted to receive the bar 341 for a sliding movement. The end of the bar 341 may be bent at right angles to provide a wide face to be engaged by the upper end of an arm 344 spring-pressed thereagainst by a spring 345. The bar 341 may have an individual restoring spring 346. Depression of the subtraction-key 340 operates to rock a shaft 347 to withdraw a hook-arm 348 from its notch in a subtraction-setting bar 349 to release said bar to be operated by a spring 350, for subtraction-setting computation.

Another interlock prevents the joint operation of the subtraction-key 340 and error-key 274, and for this purpose a bypass-bar 351 is mounted upon the plate 115 for a crosswise longitudinal movement limited by bar-guiding and bar-stopping slots 352 engaging screws 353 threaded into the plate. A suitable spring 354 restores the bar to normal position. Each end of the bar 351 is offset to elevate the plane of the ends thereof to engage with beveled studs 355 and 356 on the key-bars 275 and 341, respectively. When the error-key 274 is depressed, the stud 355 engages a beveled corner 357 and cams the bar to the Figure 8 position, where the stud 355 dwells upon the edge of the bar 351, as shown, which shifts the bar 351 against the tension of the spring 354 and wedges a beveled face 358 at the opposite end of said bar against the stud 356 on the bar 341, and prevents the depression of the subtraction-key until the return of the error-key restores the bar 351 to normal position. To prevent the springing of the bar 341 if force were applied at the locked subtraction-key, a bar-backing upright stud 359 may be fixed to the plate 115.

It will be noted at Figure 8 that the normal position of the bar 351 renders the bar operable by the error-key, and that the subtraction-key 340 may be depressed without operating said bar.

The mechanism already described for shifting the transposition levers to ineffective positions and for simultaneously preventing the depression of the key-stems 144ª may be operated by carriage-return mechanism. The mechanism already described for returning the carriage includes the pulley 77 to drive the shaft 73. The shaft 73 rotates an eccentric 360 (Figure 3) operative within a slot 361 in a lever 362 to turn the lever about a fixed axis 363 on the frame. The free end of the lever 362 has the form of a long narrow tongue 364. As long as the shaft 73 is rotated by the pulley 77 the lever 362 will be rocked once for each revolution of the shaft. This lever is hooked up to certain other mechanism so that the latter may be actuated automatically by power to relieve the operator of the manual operation of these parts.

It will be remembered that the rocking of the shaft 63 brings the two clutch members 75 and 76 into a driving interlock and closes the motor-circuit. This rocking of the shaft 63 rocks an arm 365, having a stud 366 engageable within a slot 367 of a bell-crank 368 fulcrumed at 369 to the upper end of a bracket 370, secured to the machine-frame by screws 371. An arm 372 of the bell-crank 368 rests against a stud 373 of a lever 374, pivoted at 375 to the upper end of a vertical bar 376. The lever 374, through a spring 377 attached thereto, pulls the stud 373 under tension against the arm 372, and when the bell-crank 368 is rocked by the arm 365, the stud 373 will follow the arm 372 and the upper hooked end 378 will move from its normal position shown at Figure 1 to the position of Figure 12, where the hook 378 overhangs the tongue 364 of the lever 362; and at the first operation of the motor-driven lever 362, the lever 374 and the bar 376 will be lifted to the position of Figure 13, where a fixed stop 379 on the bar 376 will engage a notched pawl 380, pivoted at 369 on the bracket 370 and provided with a spring 381, which is effective to hold the pawl in interlocking position under the stop. To permit a vertical sliding movement for the bar 376, a screw 382 passes through a slot 383 of the bracket 370.

The return of the carriage opens the clutch-members 75 and 76 by the rocking of the shaft 63, and the stud 366 will rock the pawl 380 from under the stop 379, and the arm 372 will move the lever 374 against the spring-tension of 377, and the hook 378 will be withdrawn clear of the moving tongue 364, and the bar 376 will drop by gravity, assisted by the spring 381, until the screw 382 bottoms in the slot 383 of the bracket 370, as shown at Figure 13.

In this manner the initial rotary movement of the shaft 73 lifts the bar 376 and locks it in its extreme lifted position until the end of the carriage-return cycle, and the eccentric 360 continues operating the lever 362 at each revolution thereof, but the lever 362 is ineffective to operate the bar 376 because the locking pawl 380 holds the bar in its raised position above the sweep of the tongue 364.

The lower end of the bar 376 has screwed thereto an irregular extension including a vertical section 384 adjustably secured to the bar by a screw-and-slot construction 385 and an eccentric-connection 386, whereby the extension may be minutely adjusted up or down and secured, and also including a horizontal section 387, to offset a vertical terminal 388, that has a stud 389 workable within a slot 390 in the arm 195. Said arm 195 operates the arm 194 to rock the bell-crank 216 with interponent 225 between the key-locking dogs 226, and simultaneously rocks the shaft 188 to silence the transposition levers. In this manner the lifting of the bar 376 automatically locks the numeral-keys during the carriage return.

At Figure 1, the case-shift mechanism includes a shift bar 391 upon which the carriage rides, the bar forming a part of a frame 392 swingable about a fulcrum-bar 394 on the frame and operated by a shift-key-lever 393. The frame 392 rocks the bar 394, which carries an arm 394ᵃ to rock vertical arm 395 of a bell-crank, the latter being rockable upon the shaft 50 (Figure 14) to swing a horizontal arm 397, which underlies a stud 398 projecting from the side face of the bar 376, see Figures 3 and 14. This lifts said bar and operates the numeral-key-locking interponent 225 and renders the transposition levers unable to operate the pin-bars.

It will be remembered that the tabulator-key-lever 46 rocks the shaft 50 by means of the universal bar 49; and in rocking a lever 399, Figure 14, which underlies the stud 398, the bar 376 is lifted to silence the transposition levers, as already described, during the depression of the tabulator-key.

Referring to Figures 1, 21, 22 and 23, showing the connections that drive the pulley 143, it will be seen that the motor-driven horizontal shaft 142 drives a vertical shaft 400 through spiral gears 401; the shaft 400 having a bearing in the motor-casing 82 and in the partition wall 137. The lower free end of the shaft 400 has pinned thereto a toothed driver 400ᵃ always rotating with the shaft. Loosely mounted on the shaft 400, and held against the face of the driver 400ᵃ by a screw 402 threaded into the shaft end, there is a carrier 403, having among other things a crank-pin 404 and a key-released pawl 405, the latter having a single tooth 405ᵃ to be picked up by the toothed driver 400ᵃ to rotate therewith. The pawl 405 is mounted upon a pivot-stud 406 on the carrier 403, and includes a spring-stud 407, passing through a slot 408, where the free end is connected by a spring 409 to a post 410 on the carrier. The spring draws the tooth of the pawl, when released, into the path of the toothed driver 400ᵃ.

Figures 21, 22, 23:
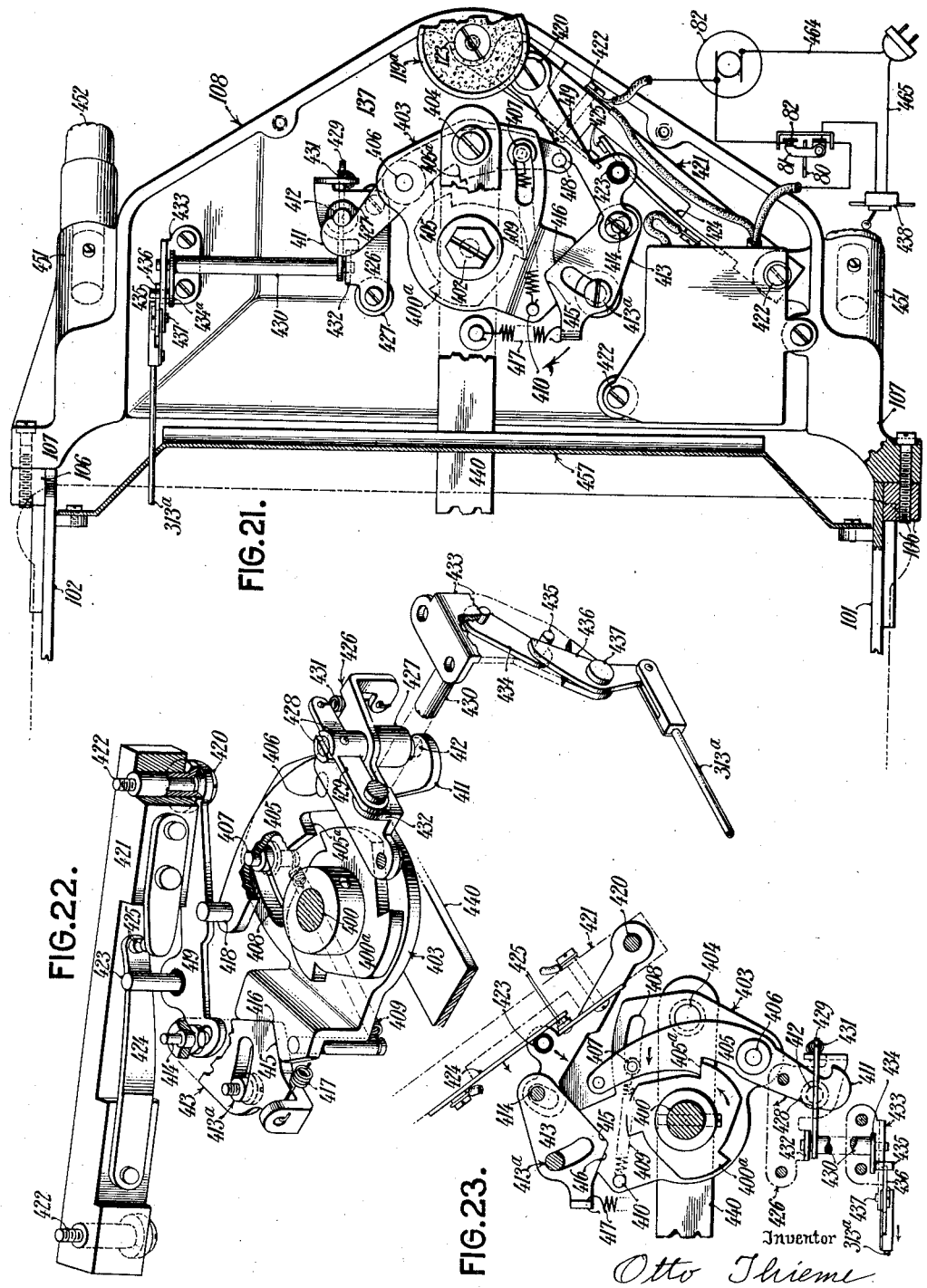
Figure 21 is an inverted plan view of the motor-unit including the motor-driven parts and the motor-circuits.
Figure 22 is a perspective normal view of the motor-driven parts, the top wall of the casing being omitted.
Figure 23 is a plan view of the parts shown at Figure 22, where the tripping means releases certain of the parts, and the motor-circuit is closed.

The normal positions of the parts are shown at Figure 21 looking at the under side of the motor-casing 108, where a hooked end 411 of the pawl 405 engages a trip pin 412. Normally the carrier 403 is detented by a pawl 413, pivoted upon the partition-wall 137 at 414, having a V-nose 415 to seat in a V-recess 416 in the edge of the carrier 403, under the tension of a spring 417. The pawl also has a stud 418, bearing against a lever 419, fulcrumed at 420 to a bar of insulation 421 secured to the wall 137 by screws 422. The free end of the lever 419 is supported by a slot-connection with the pivot-stud 414, and a post 423 insulated from the lever flexes a spring-arm 424 to open the motor-circuit by separating the contacts 425.

When the trip pin 412 is withdrawn from its pawl-holding position, Figure 21, to the position at Figure 23, in which the spring 409 has vibrated the pawl 405, it will be seen that the end of the slot 408 has brought the tooth 405ᵃ into engagement with a tooth of the driver 400ᵃ, and that simultaneously the stud 418 has been withdrawn to release the lever 419, so that the contact-arm 424 by its resilience may close the contacts 425 to energize the motor 82.

The initial rotation of the motor rotates the carrier 403 to displace the detent-pawl 413 and complete a cycle, when the stud 418 will re-engage the lever 419 to open the contacts 425, and the pawl 413 will become effective to arrest the rotating carrier 403. The rotation of the pawl 405 with the carrier 403 brings the hooked end 411 into engagement with the restored pin 412, to turn the pawl about its pivot-stud 406 to withdraw its tooth 405ᵃ from the toothed driver 400ᵃ.

This withdrawal of the pawl from the driver 400ᵃ may take place before the driver and motor have been fully silenced. The swing of the released pawl 413 may be controlled by a screw-and-slot construction 413ᵃ.

The pawl 413 prevents recoil of the carrier after a sudden stopping.

As a means of withdrawing the trip pin 412, a bracket 426 is secured to the wall 137, and includes a hollow post 427, Figure 22, through which the pin 412 has a sliding movement. The pin 412 includes a head 428, to stop against the face of the bracket 426, and is slotted to pivotally hold a lever 429, the latter having one end secured to a shaft 430 and its other end provided with a spring 431. The shaft 430 takes a bearing in an ear 432 of the bracket 426, and the other end takes a bearing in a bracket 433 also secured to the wall 137. The shaft 430 has a crank-arm 434, carrying a stud 435 engageable by one end of a lever 436 that is fulcrumed at 437 to said bracket 433. The other end of the lever 436 is connected through the link 313ᵃ to the motor-starting key 318; the pulling of the connection 313ᵃ effecting the withdrawal of the pin 412 to enable the pawl 405 to be driven by its spring 409.

At the front of the computing base a snapswitch 438 is operated by a lever 439, to open and close the main-line circuit.

The crank-pin 404 on the carrier 403 supports one end of a pitman 440, that extends forwardly under the computing mechanism. Its end is provided with a stud 441 pivotally connected to a cross-bar 442, the latter connected at each end to the side bars 443 of the general operator. This connection includes slots 444 in each bar 433, with the ends of the cross-bar 442 inserted therein. To prevent endwise displacement of the bar, screws 445 are threaded into the under side of the bar 442, with the heads against the sides 443. To the lower face of the pitman 440 a block 446 may be secured to reinforce the stud-assembly. The stud 441, passing through a working hole in the bar 442, see Figure 5, and the pitman 440, is threaded into the block 446 and provided with a check nut 447. The cross-bar 442 has a bracket 448 secured thereto and having bent-down ears 449 with pitman-supporting lugs 450 at both edges of the pitman, that provides for a slight swing of the pitman about the stud 441 due to the sweep of the crank-pin 404.

The placing of the motor at the rear of the typewriting machine enables the unit to be desk-supported, and brings the two standard registers close together, and narrows the computing base to approximately the width of the typewriter.

This desk-supported machine-unit may also include a fan-fold unit, as shown at Figure 24. The motor-casing may include sockets 451 at each side of the frame 108, to receive the ends of rods 452, that rise rearwardly, where their free ends are tied together by a platform-supporting rail 453. The rods 452 may be reinforced by tie-bars 454, connected to the typewriter-frame. In this manner are supported a fan-fold web 455 and carbon-feeding elements 456. At Figure 24, the upwardly projecting motor on the base-frame is included in the perspective of this combined typewriting, computing and fan-folding machine, wholly supported by feet resting upon a desk, but the motor may be omitted in some cases.

From the above description it will be noted that the present invention includes four separate and distinct assemblages, that may be marketed as stock units and subject to individual requisition; that these four units include a typewriting machine, a computing mechanism, a power-driving mechanism and a fan-fold mechanism; that the typewriting machine and computing mechanism may be hooked together for typing and computing, and as a finishing assembly operation, the front plate 104, the two side plates 112 and a rear cover-plate 457 may be secured in position, and the hand-lever 180 added for a manually operated unit to jointly type and compute; that subsequently, the motor-unit may be added to this two-part assembled unit for a motor-driven combination; and that the fan-fold web-support table may be joined to the two-part assembled unit or joined to the three-part assembled unit for a full and complete assembly, according to my invention.

The machine herein disclosed is further arranged to be automatically set for subtraction when the carriage enters a subtraction-zone, the mechanism including a trip lever 458 having a pull link 459 connected to a bell-crank 460 operative to withdraw a latch, and release connections effective to withdraw the hook 348 from the subtraction-setting bar 349. To operate the trip lever 458, a column-stop 44 is formed with an extension that rides over the trip lever and holds the lever in a tripped position to continue the subtraction-setting of the computing mechanism throughout the computing column-zone, as shown in detail in the O. Minton patent, dated September 24, 1918, 1,280,065.

Referring to the novel column-stop 44 and to Figure 15, it will be noted that the regular column-stop may be a standard stock unit, and to this stock product there may be assembled, as required, an extension 461 secured by rivets 462 entering pre-drilled holes in the stop. This extension 461 is aligned to trip, and pass over the lever 458 to determine the letter-space extent of the subtractive zone, as heretofore. The tripping of the lever 458 tends to lift the extension 461 and rock the column-stop 44 upon the bar 42, and to prevent this rocking strain upon the stop the extension 461 may be provided with a reinforcing element that may include a finger 463 secured to the extension 461 near the end thereof and parallel to the stop to pass under and abut the under face of the stop-bar 42 and effectively resist the extension-lifting tendency of the depressible trip lever 458. This reinforcement of the column-stop to prevent torsional displacement thereof as a whole, is an important feature where the cooperative parts are a long connected chain of closely fitted and closely adjusted parts, and where even a slight lost motion in the carriage-driven stop 44 might tend to render the computing mechanism inaccurate.

Variations may be resorted to within the scope of the invention, and portions of the improvements may be used without others.

Having thus described my invention, I claim:

1. In a typewriting and computing machine having a register with wheels operable to accumulate successive items printed by the numeral-keys of the typewriter, the combination with a key depressible to type a distinguishing character to verify the restoration of all the register-wheels to zero, of a train operable by the initial rotation of any register-wheel in accumulating a printed amount, to prevent the subsequent depression of said key during the item-accumulating stage, said train being restored by the clearing of the register-wheels to release the key to print its character, said train including a register-wheel detent vibrated by the accumulation of each digit on each wheel, a universal member vibrated by the detent first vibrated by any register-wheel, and a lock having means to detain the universal member in its vibrated position until all the register-wheels are in their zero positions.

2. In a typewriting and computing machine having a register with wheels operable to accumulate successive items printed by the numeral-keys of the typewriter, the combination with a key depressible to type a distinguishing character to verify the restoration of all the register-wheels to zero, of a train operable by the initial rotation of any register-wheel in accumulating a printed amount, to prevent the subsequent depression of said key during the item-accumulating stage, said train being restored by the clearing of the register-wheels to release the key to print its character, said train including a register-wheel detent vibrated by the accumulation of each digit on any wheel, a universal member vibrated by the detent first vibrated by any register-wheel, and means effective to detain the universal member in its first vibrated position until all the register-wheels are in their zero-positions, so that said universal member does not interfere with the vibration of any detent by any register-wheel during said accumulating stage.

3. In a typewriting and computing machine having a register with wheels operable to accumulate successive items printed by the numeral-keys of the typewriter, the combination with a key depressible to type a distinguishing character to verify the restoration of all the register-wheels to zero, of a train settable by the initial rotation of any register-wheel in accumulating an amount, to prevent the subsequent depression of said key while any wheel indicates a significant figure, latching means being provided to automatically lock said train in key-locking condition, said latching means being arranged to automatically release said train upon the clearing of the register-wheels to thereby release the key to print its character.

4. In a typewriting and computing machine having a register with wheels operable to accumulate successive items printed by the numeral-keys of the typewriter, the combination with a key depressible to type a distinguishing character to verify the restoration of all the register-wheels to zero, of a train operable by the initial rotation of any register-wheel in accumulating a printed amount, to prevent the subsequent depression of said key during the item-accumulating stage, said train being restored by the clearing of the register-wheels to release the key to print its character, said train including a register-wheel detent vibrated by the accumulation of each digit on any wheel, a universal member vibrated by the detent first vibrated by any register-wheel, a rocker vibrated by the universal member and connected to lock said key, and a latch effective to drop behind the vibrated rocker to arrest the return of the rocker, so that the latter does not interfere with subsequent vibration of said detents, said latch being released by said universal member when all the register-wheels are in their zero positions.

5. In a machine of the class described having numeral-keys, and a series of register-wheels operable under indexing control of said keys to accumulate amounts, said register-wheels normally standing at zero position, the combination with register-wheel-detenting means including a spring-pressed detent-element for each register-wheel, said register-wheel having notches co-operative with said detent-element to locate the several digit-positions of the wheel, of a train settable by the initial rotary movement of any register-wheel at the beginning of the computing period to store up a predetermined amount of energy so as to be potentially effective to aid said detent-elements in aligning said wheels transversely, means being provided to automatically release said train upon all the register-wheels reaching normal zero position, to reinforce the normal pressure of all the detent-elements to remove any spirality in the zero position of the several register-wheels.

6. In a machine having a typing mechanism superposed on a computing base, said typing mechanism having numeral-keys and a co-operating carriage, and said computing base having spaced sets of denominational register-bars displaceable in denominational order by said carriage for indexing by said keys; the combination with a tappet on said carriage, of a plurality of sets of denominational thrust-rods, said rod-sets ranging upwardly from connections to corresponding sets of register-bars, and the rod-sets converging so that the upper rod-ends form a plurality of rows, one row behind the other, thereby forming a localized zone for actuation of either set of rods by said tappet, and corresponding rows of vertically-depressible plungers topping the upper ends of said converging sets of rods, the tops of said plungers being engageable by said tappet, means being provided to mount the plungers for vertically endwise actuation, and oblique-guiding means being also provided to guide obliquely the upper end-portions of said rods, for axial movements of the rods, said movements being oblique to the axes of said plungers, whereby the rods of the converging sets may be straight to simplify the rods and to afford a straight-line axis of thrust for obviating lost-motion-producing deflection of the rods.

7. A computing-machine base of the character described and serving as a mount for a typewriting machine; said base having a framework including spaced side-members forming the outer side-walls of said base, each side-member being of hollow construction to afford room within its confines for certain parts of the computing-base mechanism, each side-member including two parts, one part being an inner plate joined to transverse structure of the framework and forming the mechanism-supporting side-member proper, the other part being a finishing mask substantially coinciding in contour with the outer edges of said inner plate to form the side elevation outline of the computing-machine base, said mask being removably secured to said plate in outwardly-spaced relation to the latter to afford said room, the outer edge-portion of the mask being turned inwardly to blend with the outer edge-portion of the inner plate, and thereby, at the edge-portion of the composite side-member, close the gap between the spaced inner part and the mask; whereby said mask may be separately finished, and whereby the finished mask need not be on the computing base and its finish subject to marring, while the computing base is being handled.

OTTO THIEME.